March 10, 1953
A. Y. DODGE
2,630,896
ONE-WAY CLUTCH
Filed Aug. 2, 1951
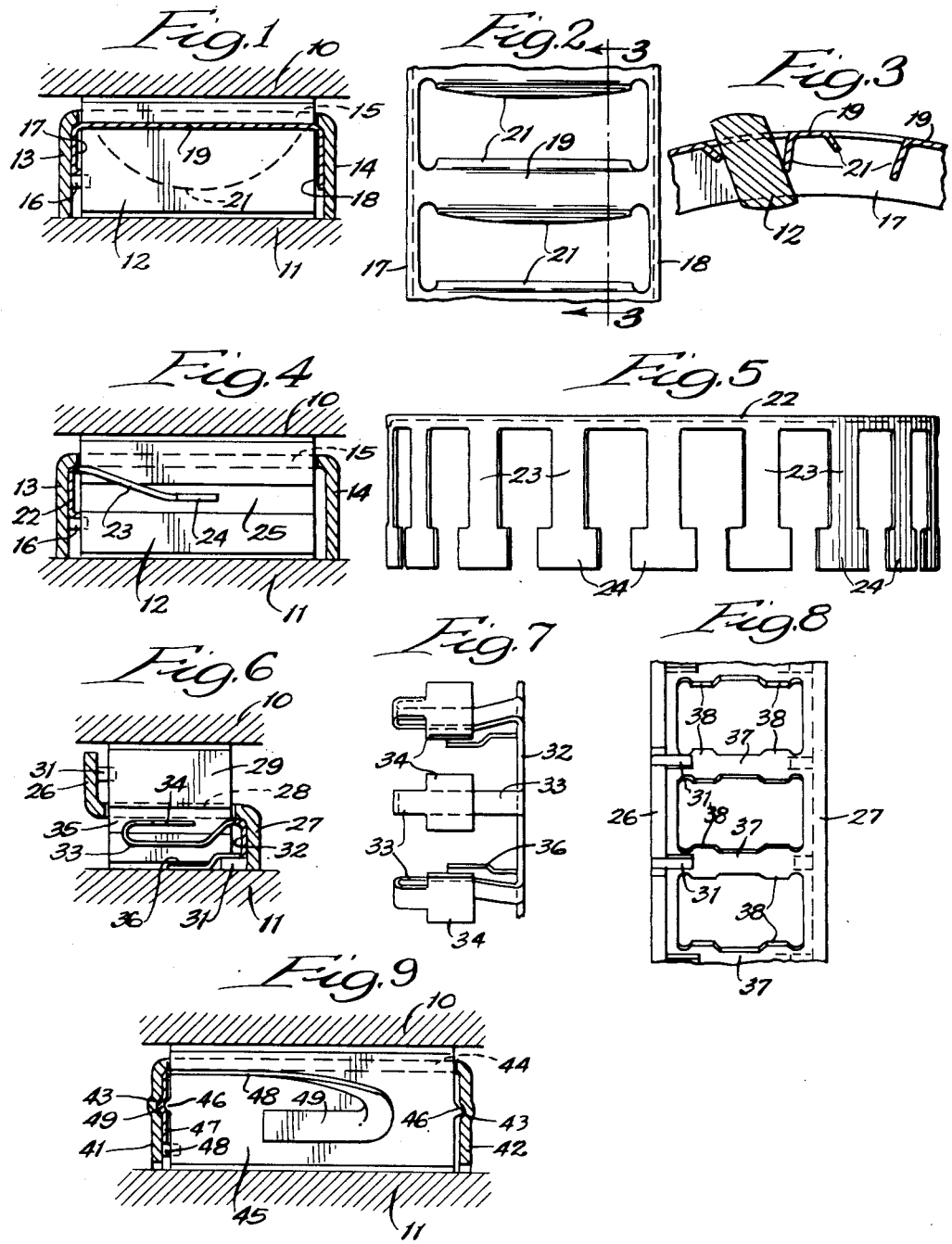
INVENTOR:
Adiel Y. Dodge,
BY
E. S. Booth,
ATTORNEY.

Patented Mar. 10, 1953

2,630,896

UNITED STATES PATENT OFFICE 2,630,896

ONE-WAY CLUTCH

Adiel Y. Dodge, Rockford, Ill.

Application August 2, 1951, Serial No. 239,872

19 Claims. (Cl. 192—45.1)

1

This invention relates to a one way clutch and more particularly to a one way clutch of the tilting gripper type.

In tilting gripper clutches it is necessary to provide spring means to urge the grippers toward their engaging position so that they will engage quickly and uniformly upon a reversal in torque. It is also highly desirable, if not necessary, to provide a cage to hold the grippers properly spaced in the assembly and to limit tilting thereof in the disengaging direction thereby to prevent damage to the spring means.

It is one of the objects of the present invention to provide a one way clutch including a cage and a spring means, and in which the spring means is mounted in and supported by the cage.

Another object is to provide a one way clutch in which the spring means is formed of an integral strip of spring material with an end ring lying against a flange of the cage and with resilient fingers extending between and engaging the grippers to urge them toward their engaged position.

According to one feature of the invention the faces of the grippers are formed with grooves and the spring fingers have lateral projections at their ends extending into the grooves.

A further object is to provide a one way clutch in which the grippers are held in the cage by projections centrally located at the gripper ends fitting into indentations in the cage flanges. Preferably the end ring of the spring means is also formed with an internal indentation to receive the projections on the adjacent gripper end and with a corresponding external projection to fit into the indentation in the cage flange.

A still further object is to provide a one way clutch in which the spring means is formed with resilient fingers frictionally engaging one of the races to urge the cage frictionally to turn with the race.

A specific object is to provide a one way clutch in which the cage is Z shaped with a central cylindrical web formed with openings through which the grippers extend. This shape is easy to form and provides a very effective and advantageous cage construction.

The above and other objects and features of the invention will be more readily apparent from the following description of the embodiments shown in the accompanying drawing in which Figure 1 is a partial axial section of a one way clutch embodying the invention;

Figure 2 is a partial plan view of the spring member of Figure 1;

2

Figure 3 is a section on the line 3—3 of Figure 2;

Figure 4 is a view similar to Figure 1 of an alternative construction;

Figure 5 is a plan view of the spring means of Figure 4;

Figure 6 is a view similar to Figure 1 of another alternative construction;

Figure 7 is a partial plan view of the spring means of Figure 6;

Figure 8 is a partial plan view of the cage of Figure 6; and

Figure 9 is a view similar to Figure 1 of still another embodiment of the invention.

In the construction shown in Figures 1 to 3, the clutch is adapted to connect an outer race 10 having an inner cylindrical surface to an inner race 11 having an outer cylindrical surface coaxial with the surface of the outer race 10. The races are adapted to be connected for rotation together in one direction by a series of tiltable grippers 12 arranged in annular array between the races. Each of the grippers has its opposite edge surfaces formed on arcs struck about spaced centers so that when the grippers tilt in one direction they will connect the races, and when they tilt in the opposite direction they will release the races for free rotation.

The grippers are held assembled in proper spaced relationship between the races by an annular channel shaped cage having end flanges 13 and 14 connected by spaced cross bars 15 to leave openings in the web of the cage through which the grippers extend.

To limit tilting of the grippers the cage preferably has struck up from at least one of its flanges a series of inwardly extending lugs 16 which project between the grippers. When the grippers tilt they will engage the lugs 16 and the cage cross bars thereby to limit their tilting movement particularly in the releasing direction to an amount which will prevent damage to the spring means employed with the clutch.

To hold the cage centered between the races, the end flanges 13 and 14 may engage the inner race as shown in Figure 1. This will not only hold the cage properly centered, but will also produce a light friction drag between the cage and the inner race which will assist in controlling tilting of the grippers.

The grippers are adapted to be urged toward their engaging position by a spring member formed of a channel shaped strip of spring material having end flanges 17 and 18 connected by axially extending fingers 19. The spring member is assembled in the cage in nesting relationship therewith as shown, with its end flanges lying against the end flanges of the cage and with its end flange 17 fitting between the fingers 19 and the web portion of the cage. In this way the spring member is held securely in assembled relationship without requiring any separate fastenings.

The fingers 19 of the spring are formed with edge lips 21 which project inward therefrom to engage the side faces of the grippers. The lips 21 are cut at their ends as seen in Figure 2 so that they are resilient and will press against the gripper faces with resilient force. The lips at one side of the fingers may extend further inward radially than those at the opposite side so that they will exert a resilient turning couple on the grippers tending to tilt them toward their engaged position.

In the construction of Figures 4 and 5, all of the elements except the spring are substantially identical with those of Figures 1 to 3, and are indicated by the same reference numerals. In this construction the spring member includes a single annular end ring 22 which fits against the cage flange 13 above the lugs 16 to be held in place thereby.

From the upper edge of the end ring 22 a series of resilient fingers 23 project axially and radially inward and terminate at their ends in lateral projections 24. The grippers are formed in their faces with grooves 25 into which the projections 24 extend and the grooves may be so located with respect to the members 24 that a spring projection at one side of a gripper will tend to urge it radially inward while the spring projection at the opposite side will tend to urge it radially outward. This produces a turning couple on the grippers tending to tilt them toward their engaged position. It will be understood that the spring fingers could be twisted slightly if desired, to produce this effect. It will also be observed that with this construction the spring fingers tend to hold the grippers against accidental radial displacement from the cage so that the assembly can be handled as a unit for storing and general handling.

In the construction of Figures 6 to 8, the cage is formed of a Z-shaped strip with an outwardly projecting end flange 26 at one side and an inwardly projecting end flange 27 at the opposite side. The end flanges are connected by a central web 28 which is formed with openings therein through which the tiltable grippers 29 may extend. Inwardly turned lugs 31 on the end flanges project between the grippers to limit tilting thereof in the same manner as the lugs 16.

The spring member in this construction comprises an integral spring strip having a flat annular end ring 32 which fits against the inner edge flange 27 and above the lugs 31 thereon. From the upper edge of the end ring 32 resilient spring fingers 33 project and are looped as seen in Figure 6. At their free ends the spring fingers 33 are formed with lateral projections 34 which extend into cross grooves 35 in the faces of the grippers. The spring fingers functions in much the same manner as those of Figures 4 and 5, to urge the grippers to tilt toward their engaging position and to hold them assembled in the cage.

The inner edge of the end ring 32 is formed with a series of inwardly extending resilient fingers 36 which press frictionally against the surface of the inner race 11 and thereby tend to turn the cage with the inner race. The springs may hold the outer ends of the grippers in light frictional engagement with the outer race and since the cage tends to turn with the inner race, all of the grippers will be tilted very quickly toward their engaged position upon a torque reversal in the proper direction.

According to another feature of the construction of Figures 6 to 8, the cage itself may be formed with projections fitting into the grooves 35 in the grippers to hold the grippers assembled in the cage. As best seen in Figure 8, the web of the cage is formed by cross bars 37 which are provided at their edges with short outwardly extending ears 38. The space between the cross bars 37 is such that the ears 38 will extend slightly into the grooves 35 in the grippers to prevent accidental radial displacement of a gripper without interfering with free tilting thereof. In assembling the grippers in this cage they are preferably forced radially inward between the cross bars until the ears 38 fall into the grooves 35. The ears 38 will spring back at least partially to their original shape when they enter the grooves 35 and if desired, the grippers may have outward pressure applied thereto to bend the ears back completely to their original position.

In the construction of Figure 9, the cage is formed of a channel shaped annular strip with end flanges 41 and 42, each of which has pressed therein internal indentations 43 which may be separate spaced indentations or which may, if preferred, be a complete annular groove. The end flanges are connected by spaced cross bars 44 between which the tiltable grippers 45 extend.

The tiltable grippers are formed centrally of their ends with short projections 46 which are adapted to extend into the indentations 43 to hold the grippers assembled in the case. The projections 46 can easily be formed in the manufacture of the grippers which are made in the form of a continuous strip of hardened steel and are cut off to the desired length by cut-off wheels. During the cut-off operation to form the projections 46 the wheels may be provided with tapered or rounded ends, or may be moved inward from the opposite edges of the grippers to a point where they almost but not quite meet. This will leave the relatively short projections 46 at the centers of the gripper ends and the ends of these projections may, if desired, be dressed off against the side of one of the wheels by moving the wheel slightly outward from the gripper end and then across the tip of the projection.

In the construction of Figure 9, the spring member includes an integral spring strip having a flat end ring 47 fitting against the cage flange 41 and above the lugs 48 thereon. The end ring is intended as indicated at 49, to leave an internal indentation into which the projection 46 on the adjacent gripper end can extend. At the outer surface of the end ring, the indentation 49 will form a projection which can fit into the adjacent indentation 43 so that the parts will all be held securely assembled.

From the outer edge of the end ring 47 a series of resilient fingers 48 extend inward and are twisted so that their end portions 49 will lie flat against the gripper faces. The spring fingers will exert a resilient force on the grippers tending to tilt them toward their engaged positions.

While several embodiments of the invention have been shown and described in detail, it will be understood that they are illustrative only and are not to be taken as a definition of the scope

What is claimed is:

1. A one way clutch comprising a series of tiltable grippers arranged in annular array, a cage formed with a series of cross bars between which the grippers extend and an end flange partially overlying the ends of the grippers, and a spring member including an end ring fitting against the end flange and a series of fingers integral with the end ring extending between the grippers and resiliently urging them toward their engaging position.

2. A one way clutch comprising a series of tiltable grippers arranged in annular array, a cage formed with a series of cross bars between which the grippers extend and an end flange partially overlying the ends of the grippers, and a spring member including an end ring fitting against the end flange and a series of fingers integral with the end ring extending between the grippers and resliently urging them toward their engaging position, and the end flange having lugs projecting inward therefrom between the grippers to limit tilting of the grippers and to hold the end ring in place.

3. A one way clutch comprising a series of tiltable grippers arranged in annular array, a cage formed with a series of cross bars between which the grippers extend and an end flange partially overlying the ends of the grippers, and a spring member including a substantially flat annular end ring fitting against the end flange and a series of integral fingers extending axially from the outer edge of the end ring between the grippers and engaging the grippers to urge them resiliently toward their engaging position.

4. A one way clutch comprising a series of tiltable grippers arranged in annular array, a cage formed with a series of cross bars between which the grippers extend and an end flange partially overlying the ends of the grippers, and a spring member including a substantially flat annular end ring fitting against the end flange and a series of integral fingers extending axially from the outer edge of the end ring between the grippers, the grippers having grooves in their faces and the fingers having lateral projections at their ends extending into the grooves.

5. A one way clutch comprising an annular channel shaped cage having a series of openings in its web, a series of tiltable grippers in the cage extending through the openings, and a spring member including an end ring fitting against one of the cage flanges and a series of fingers integral with the end ring extending between the grippers and resiliently urging them toward their engaging position.

6. A one way clutch comprising an annular channel shaped cage having a series of openings in its web, a series of tiltable grippers in the cage extending through the openings, and a spring member including an end ring fitting against one of the cage flanges and a series of fingers integral with the end ring extending between the grippers and resiliently urging them toward their engaging position, and said one of the cage flanges having lugs projecting inward therefrom between the grippers to limit tilting of the grippers and to hold the end ring in place.

7. A one way clutch comprising an annular channel shaped cage having a series of openings in its web, a series of tiltable grippers in the cage extending through the openings, and a spring member including a pair of end rings fitting against the cage flanges and fingers integrally connecting the end rings and having resilient side flanges engaging the grippers and urging them toward their engaging position.

8. A one way clutch comprising an annular channel shaped cage having a series of openings in its web, a series of tiltable grippers in the cage extending through the openings, and a spring member including a flat end ring fitting against one of the cage flanges and a series of fingers integral with the end ring extending between and resiliently engaging the grippers, the cage flanges and the end ring being formed with internal depressions, and the grippers having projections centrally of their ends fitting into the depressions to hold the grippers assembled in the cage.

9. A one way clutch comprising an annular channel shaped cage having a series of openings in its web, a series of tiltable grippers in the cage extending through the openings, and a spring member including a flat end ring fitting against one of the cage flanges and a series of fingers integral with the end ring extending between the grippers and bent radially and twisted so that their flat sides engage the faces of the grippers, the cage flanges and the end ring being formed with internal depressions and the grippers having projections centrally of their ends fitting into the depressions to hold the grippers assembled in the cage.

10. A one way clutch comprising an annular cage Z shaped in section with its central web extending axially and formed with a series of openings, a series of tiltable grippers extending through the openings, and a spring member including an end ring fitting against one of the cage flanges and having resilient fingers integral therewith projecting between and engaging the grippers.

11. A one way clutch comprising an annular cage Z shaped in section with its central web extending axially and formed with a series of openings, a series of tiltable grippers extending through the openings, and a spring member including an end ring fitting against one of the cage flanges and having resilient fingers integral therewith projecting between and engaging the grippers, and the grippers having grooves in their faces and the fingers having lateral projections at their ends to fit into the grooves.

12. A one way clutch comprising an annular cage Z shaped in section with its central web extending axially and formed with a series of openings, a series of tiltable grippers extending through the openings, and a spring member including an end ring fitting against one of the cage flanges and having resilient fingers integral therewith projecting between and engaging the grippers, and having additional resilient fingers adapted to engage the surface of an adjacent race.

13. A one way clutch comprising an annular cage having a series of cross bars defining spaced openings, tiltable grippers in the cage extending through the openings and having grooves in their faces, projecting lips on the cross bars extending into the grooves to hold the grippers in the cage, and a spring member carried by the cage and having resilient fingers engaging the grippers to urge them toward their engaging position.

14. A one way clutch comprising an annular cage having a series of cross bars defining spaced openings, tiltable grippers in the cage extending through the openings and having grooves in their faces, projecting lips on the cross bars extending into the grooves to hold the grippers in the cage, and a spring member carried by the cage and having resilient fingers extending between the grippers and formed with lateral projections at their ends extending into the grooves.

15. A one way clutch comprising inner and outer races having spaced cylindrical surfaces, an annular cage fitting between the races having a web formed with a series of openings and a flange at one end of the web, an annular series of tiltable grippers between the races extending through the openings in the cage web, and a spring member including an end ring fitting against the flange and a series of fingers integral with the end ring projecting between and engaging the grippers.

16. A one way clutch comprising inner and outer races having spaced cylindrical surfaces, an annular cage fitting between the races having a web formed with a series of openings and a flange at one end of the web, an annular series of tiltable grippers between the races extending through the openings in the cage web, and a spring member including an end ring fitting against the flange and a series of fingers integral with the end ring projecting between and engaging the grippers, and additional resilient fingers integral with the end ring frictionally engaging the adjacent race surface.

17. A one way clutch comprising an annular channel shaped cage having a series of openings in its web, a series of tiltable grippers in the cage extending through the openings, and a spring member having an end ring fitting against one of the flanges of the cage, axially extending fingers integral with the end ring projecting between the grippers, and integral resilient side flanges on the fingers extending at an angle from the edges thereof and engaging the opposite sides of the grippers at radially spaced points resiliently to urge them toward their engaging position.

18. The construction of claim 17 in which the cage has integral lugs on one of its end flanges projecting inward therefrom between the grippers to limit tilting of the grippers.

19. A one way clutch comprising an annular channel shaped cage having a series of openings in its web, a series of tiltable grippers in the cage extending through the openings, and a spring member having a pair of annular end rings fitting against the cage flanges, integral fingers connecting the end rings and lying between the grippers, and integral resilient side flanges on the fingers extending at an angle from the edges thereof and resiliently engaging the opposite sides of the grippers at radially spaced points resiliently to urge them toward their engaging position.

ADIEL Y. DODGE.

REFERENCES CITED

The following references are of record in the file of this patent:

UNITED STATES PATENTS

| Number | Name | Date |
|---|---|---|
| 2,342,227 | Swenson | Feb. 22, 1944 |
| 2,360,481 | Dodge | Oct. 17, 1944 |
| 2,366,843 | Dodge et al. | Jan. 9, 1945 |
| 2,383,595 | Dodge | Aug. 28, 1945 |
| 2,389,961 | Dodge | Nov. 27, 1945 |